May 7, 1940.   J. T. DICKSON   2,199,785
LANDING GEAR BRAKE
Filed Feb. 8, 1939   3 Sheets-Sheet 2
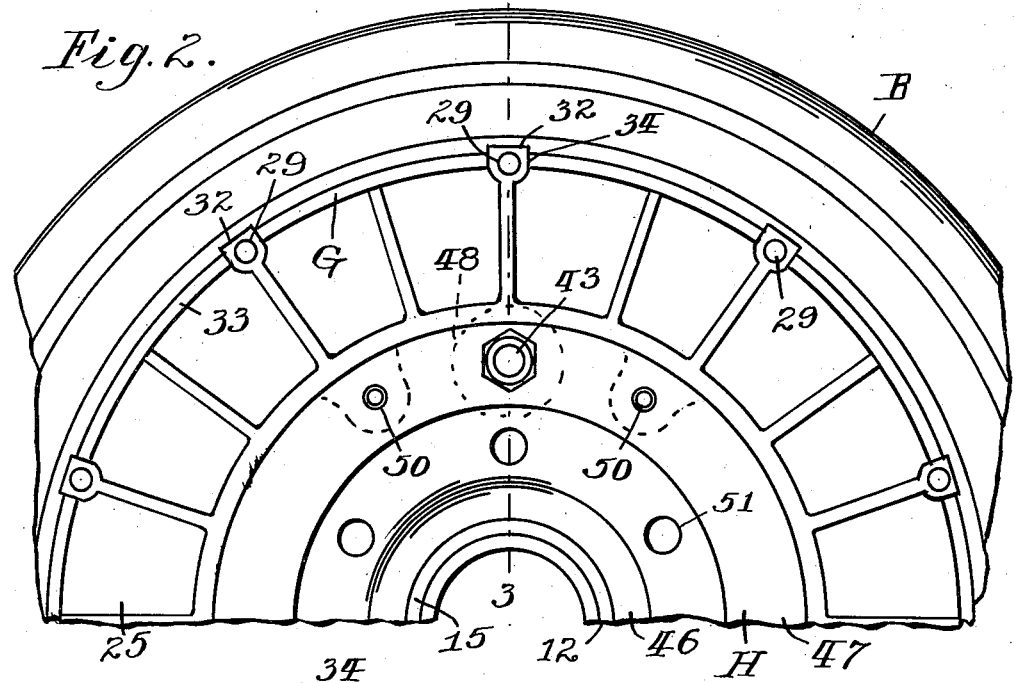
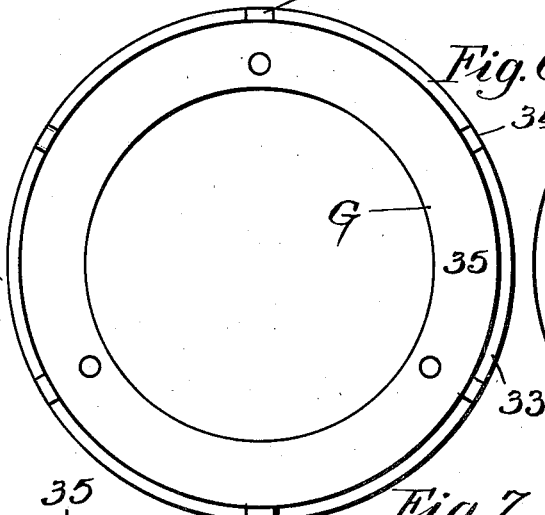
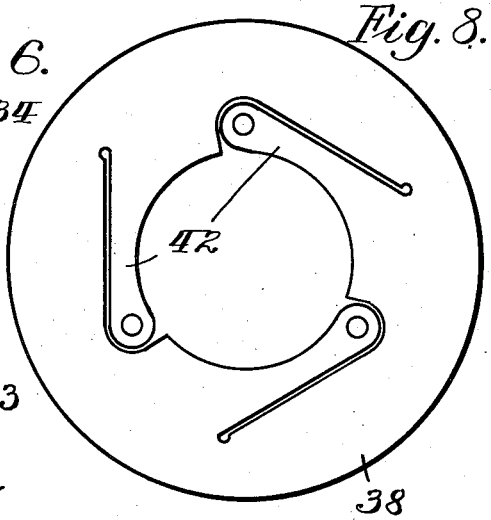
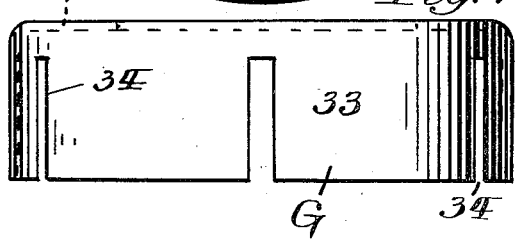
INVENTOR.
James T. Dickson
BY
ATTORNEY.

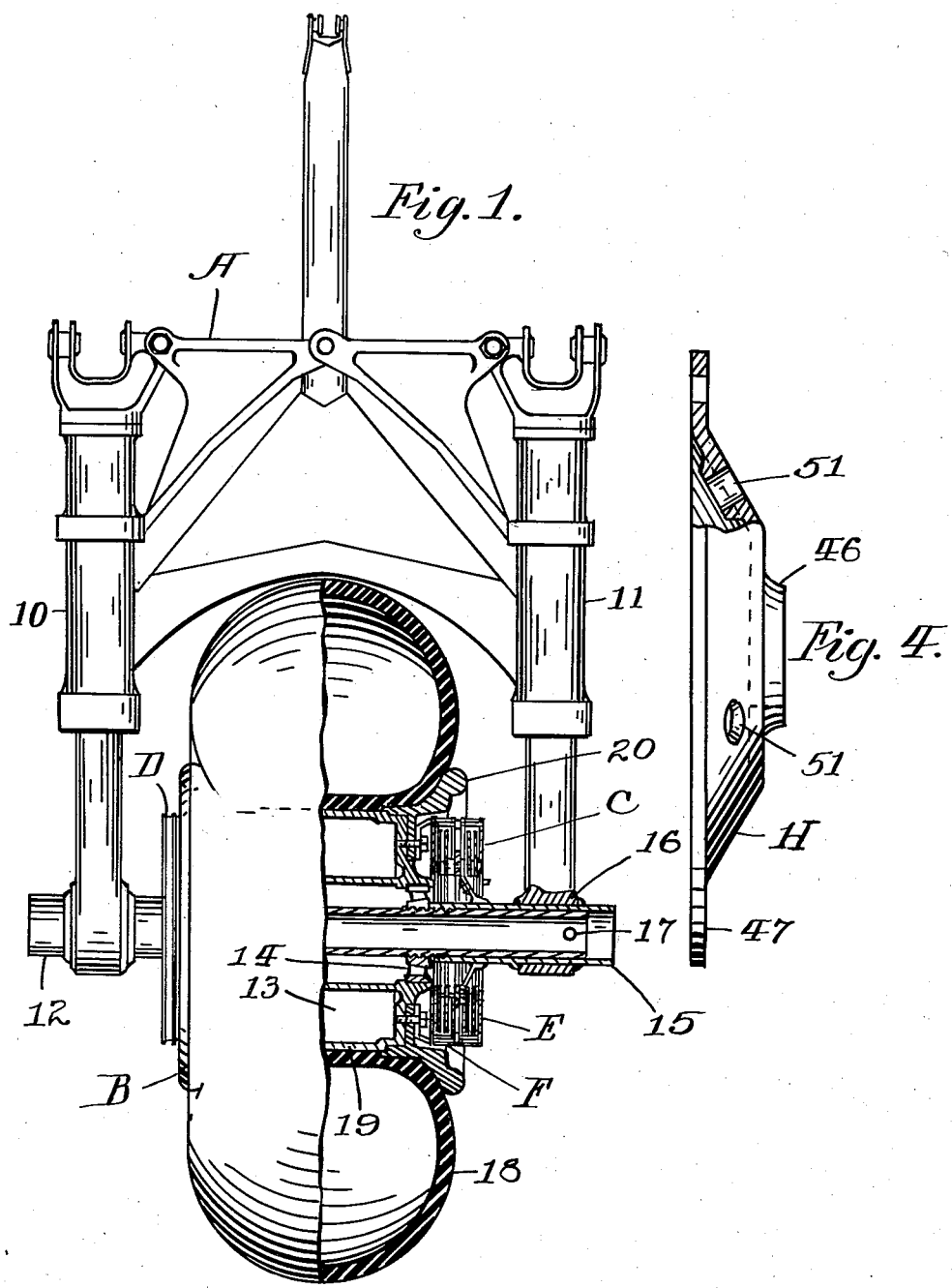

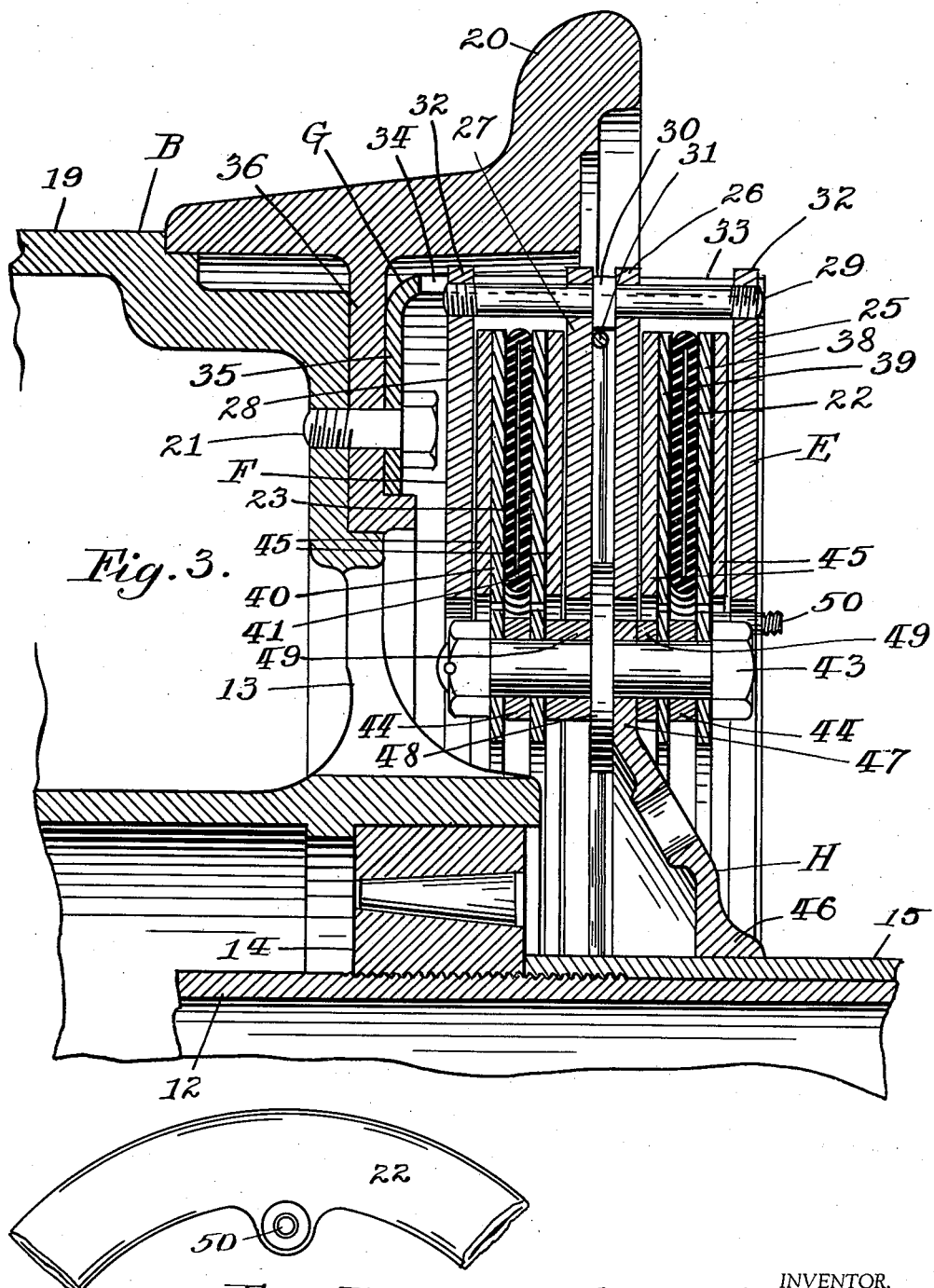

Patented May 7, 1940

2,199,785

UNITED STATES PATENT OFFICE 2,199,785

LANDING GEAR BRAKE

James T. Dickson, Los Angeles, Calif.

Application February 8, 1939, Serial No. 255,305

7 Claims. (Cl. 188—152)

This invention relates to fluid actuated brakes of the multiple disc type which are applicable for use in double form on each side of a landing wheel of an airplane landing gear. Large airplanes such as have recently been developed require extremely powerful braking means which will bring the plane to a quick but gradual stop through the use of its landing gear, this work being increased through the limitation of use of but few landing wheels. It is the primary object of my invention to provide a simple and effective brake that will answer these requirements. My improved brake in double form is built into each side of the landing wheel and into the frame of the landing gear to which it is desired to apply braking action, whereby the raising and lowering of the landing gear is not disturbed and the parts of the brake are readily accessible for observation and are not likely to get out of adjustment when used under extremely severe strains to which landing gear is subjected. The construction, according to my invention is such that both wheels of the landing gear may be used as braking units and since the brake is in and part of each wheel and the landing gear structure, there are no mechanical difficulties to be overcome. Also the construction is such that the parts of the brake are effectively cooled automatically, thus overcoming objectionable heating of the parts of the brake due to excessive strains and tendency to overheat. It is also a further object of my invention to produce a brake as applied to a landing gear which is balanced in action and is free from objectionable drag. A further object is to provide an improved construction, by which the brakes can be instantly set and as gradual as desired to apply effective braking power by the application of slight air pressure and in which the braking contact is applied evenly at all points to efficiently distribute friction. These objects and others, and the corresponding accomplishments and features of my invention will be best understood from the following description of a specific form of the device that embodies the invention, reference for this purpose being had to the accompanying drawings in which: Fig. 1 is a plan partly in section of a portion of an airplane landing gear showing my improved brake applied; Fig. 2 is an end elevation on an enlarged scale of a portion of my improved brake and a detail of the landing gear shown in Fig. 1; Fig. 3 is a vertical section of a detail taken on line 3—3 of Fig. 2, showing a portion of my improved brake applied to a portion of the landing gear; Fig. 4 is a side elevation partly in section of the disc by which the stationary element of the brake is supported upon the landing gear; Fig. 5 is a plan of a detail showing a portion of the expansion cell used with my improved brake; Fig. 6 is a front elevation of the cage by which the revoluble member of the brake is mounted upon the rim of the landing wheel; Fig. 7 is an elevation looking at the side of the cage shown in Fig. 6; Fig. 8 is a plan of one of the stationary resilient friction discs used with my improved brake, and Fig. 9 is an edge view of the structure shown in Fig. 8.

In the drawings, A indicates a portion of the landing gear of an airplane in which one of the landing wheels B is freely journaled, that portion shown resembling a yoke frame having the pair of usual shock absorbers 10 and 11 and the horizontal tubular axle 12 upon which the spindle 13 of the landing wheel B is freely journaled by means of the antifriction bearings, such as 14. 15 indicates the usual stationary quill which with the axle 12 is fixed to the corresponding bearing 16 of one of the shock absorbers, by the pin 17 or any other suitable means. 18 indicates the tire which is held on the periphery 19 of the spindle 13 by the detachable rims such as 20, the latter being secured to the spindle by bolts such as 21. Two of my improved brakes C and D, of suitable similar construction are applied to each opposite end of the wheel spindle and can be operated simultaneously to apply or release braking power. A description in detail of one will therefore suffice.

My improved brake comprises two braking units E and F of general similarity arranged side by side in a single composite structure and of disc type, there being a separate fluid actuated expansion cell for operating each unit of the brake structure, the cell 22 being employed in the outer unit and the cell 23 in the inner unit. Each of these units is provided with revoluble and stationary elements, the former being attached to the wheel and the latter to the stationary quill 15. The revoluble element of each brake consists of outer concentric discs of substantially even diameter and radial width suitably spaced apart longitudinally. Two pairs of these discs are provided, the discs 25 and 26 of one pair forming the revoluble friction faces of the braking unit E and the discs 27 and 28 of the other pair forming the revoluble friction face elements of the braking unit F. These discs are held in assembled position spaced apart by the plurality of circumferentially spaced longitudinal bolts 29 through their rims. Each bolt has the opposite ends of its shanks threaded in opposite directions into the outer discs 25 and 28 of both pairs. The median portion of the bolt is formed with a flat sided head 30 which holds the inner discs 26 and 27 spaced apart. Thus by turning the heads 30 of the bolts by a suitable wrench the outer discs are simultaneously adjusted apart to vary the distance between each of the pairs of the revoluble discs. An expansion ring 31 within the space between the inner discs 26 and 27 presses outwardly against the heads 30 of the bolts to normally prevent the bolts turning but permitting them to be turned by a wrench for adjustment purposes.

The revoluble discs of the brake units are formed with lugs 32 projecting radially from the periphery of each of said discs and evenly spaced circumferentially. These lugs on the several discs are arranged in longitudinal alignment. The entire assemblage of revoluble discs is held in a cage G on the side of the spindle of the wheel with the discs concentric with the axis of the wheel. This cage resembles a drum 33 in which the assembled discs are gibbed and held firmly, said drum being slotted longitudinally at 34 to admit the lugs 32 of the discs whereby the assemblage of discs as described has free longitudinal movement but is firmly embraced by the cage and caused to rotate with the wheel while allowing longitudinal freedom. The inner end of the drum is turned inwardly to form a vertical flange 35 which is fixed to the side of the spindle over the inturned vertical rib 36 of the wheel rim 20 by the same bolts 21 which secure the rim on the wheel or by any other suitable means desired.

The stationary element of each brake consists of two pairs of resilient discs, one pair 38 and 39 extending radially outwardly into the space between the revoluble discs 25 and 26 and the other pair 40 and 41 extending radially outwardly into the space between the revoluble discs 27 and 28. Each of these stationary discs (see Figs. 8 and 9) consists of a thin disc of spring material formed with a plurality of inwardly tangential spring arms 42 lying in the plane of the disc. The inner extremities of these spring arms are mounted upon longitudinal tie bolts such as 43. The fluid actuated expansion cell 22 is placed between the outer pair of stationary spring discs 38 and 39 and the fluid actuated expansion cell 23 is placed between the inner pair of stationary spring discs 40 and 41, spacing washers 44 being placed between the discs for holding them in juxtaposition. The friction side faces of the stationary discs nearest the companion revoluble disc of the brake is surfaced at 45 with discs of suitable anti-wear brake lining. Normally the revoluble spring discs hold the friction faces out of contact with the companion revoluble discs but when the expansion cells are inflated under pressure the spring discs are sprung apart on their resilient arms 42 and the friction faces engage the revoluble discs and retard the revolution of the wheel.

The assemblage of stationary resilient friction discs is held upon a stationary circular support H which resembles a conical shell having a central bearing 46 secured by welding or other suitable means upon the stationary quill 15 and a peripheral flange 47, to which the stationary discs are clamped by the bolts 43. A washer 48 assists the bolt head 30 in spacing the revoluble discs 26 and 27 apart and the washers 49 also assist in suitably spacing the stationary discs apart on the supporting bolts 43. As many of the supporting bolts 43 may be employed as desired to fasten the stationary friction discs on the support H and in operative position.

Each expansion cell by which the braking power is applied is provided with a nipple 50 extending outwardly from within the assembled stationary discs by which air or other fluid actuating medium is applied for operating the brake from any source desired.

A circulation of air for cooling the surfaces of the brake is provided through suitable channels or openings 51 in the stationary support H, the spaces between the revoluble brake discs 26 and 27, and the inner ends of slots 34 in the cage G. By this means the centrifugal action produced by the wheel tends to draw fresh cool air into the vortex of the brake and force it outwardly through said channels thus reducing the temperature of the discs and other members of the brake.

The application of a double set of brake units to each side of the landing wheel provides an exceedingly powerful brake which can be quickly and gradually applied thus enabling the operator to bring a heavy plane to a quick but not too sudden stop. The parts of the brake are simple and efficient and not liable to get out of order. Also the surfaces of the brake are efficiently cooled to prevent damage from overheating and unnecessary wear. They also provide for even longitudinal and radial expansion between the parts.

Various modifications of the invention are contemplated within its spirit and within the scope of the following claims.

I claim:

1. A brake for an airplane landing gear, comprising, a plurality of pairs of inwardly extending revoluble friction discs having means for attaching to a wheel to which braking effort is to be applied, means by which the members of all of the pairs of discs are adjusted apart, a stationary quill about which said discs are journaled, a pair of non-revoluble friction discs between each pair of revoluble discs, connected to said quill and movable longitudinally to spread into engagement with and apply braking action to said revoluble friction discs or retract out of contact therewith, and a fluid expansion cell between each pair of non-revoluble friction discs normally permitting the revoluble discs to revolve freely and when inflated to apply braking action by the stationary discs and retard the revolution of the wheel.

2. A brake for an airplane landing gear, comprising, an idle wheel having a rim forming a tire seat, an annular detachable tire engaging flange seated upon said rim, having an annular inwardly extending rib impressed against the side of said rim, a revoluble brake member having a supporting cage impressed against said rib, fastening means engaging said cage and rib upon the side of said rim, said revoluble brake member having a plurality of inwardly extending friction discs coaxially arranged and spaced longitudinally apart, a stationary quill coaxial with said discs, said wheel being journaled to revolve freely about the axis of the quill, an annular support rigidly carried by said quill, a stationary brake member upon said support having pairs of non-rotatable longitudinally movable radiating friction discs adapted to be spread against the revoluble friction discs, and fluid actuating expansible means between each pair of stationary friction discs adapted when inflated to spread the stationary discs of each pair and apply braking effort to the revoluble discs and retard the revolution of the wheel.

3. In a landing gear having a relatively stationary supporting frame and a wheel journaled freely in said frame, a plural set of brakes including a plurality of coaxially arranged brake units tied together side by side in a composite structure each unit having a plurality of freely revoluble friction elements and a plurality of resilient non-revoluble elements in cooperation with said revoluble elements, said resilient members being subject to deformation to apply braking action to the revoluble elements, means for attaching said revoluble elements to said wheel in coaxial relation thereto, means for attaching said non-revoluble elements to said supporting frame with their friction faces out of cooperative engagement with the friction faces of said revoluble elements and fluid actuated means for simultaneously deforming the non-revoluble elements of both of said brake units into frictional connection with said revoluble elements to retard the revolution of said wheel.

4. In an airplane landing gear having a relatively stationary supporting frame and a landing wheel journaled freely in said frame, a plurality of brake units disposed side by side in a single composite structure, said units having a plurality of pairs of revoluble friction discs tied together, a cage having an annular shell embracing and coaxially fastening said discs to an end of said wheel, resilient stationary friction discs arranged in pairs and tied together into a single composite structure, one pair being arranged between each pair of revoluble friction discs, a supporting element for said stationary friction discs immovably mounted upon said wheel supporting member, and an expansion cell between the members of each pair of resilient stationary discs adapted when inflated to deform the stationary friction discs into frictional engagement with the companion pair of revoluble discs.

5. In combination with the revoluble wheel and stationary wheel supporting members of a primary couple to which braking action is to be applied, a plurality of brake units disposed side by side in a single composite structure, said units having a plurality of pairs of revoluble friction discs tied together, the members of each pair being spaced laterally apart, a cage enveloping said discs gibbed thereto to permit relative longitudinal freedom and fixed upon an end of said wheel coaxial thereto, a plurality of pairs of stationary resilient discs concentric with said revoluble discs and fixed to said wheel supporting member, one pair of said resilient discs being placed between each pair of said revoluble discs, and an expansion cell between the members of each pair of said stationary discs adapted when inflated to deform the resilient discs into frictional engagement with the companion pair of revoluble discs.

6. In combination with the revoluble wheel and stationary supporting member of a wheel structure to which braking action is to be applied, a pair of brake units disposed side by side, said units having a double pair of revoluble friction discs, bolts through all of said discs and oppositely threaded into the outermost discs of said brake units by the turning of which the discs of both pairs can be adjusted apart simultaneously and by which all of said discs are tied together into a single composite structure, said discs having guide lugs spaced circumferentially apart on their peripheries, a cage enveloping said discs having longitudinal slots in which said lugs are gibbed to permit longitudinal freedom and fixed upon an end of said wheel coaxial with the latter, pairs of stationary resilient friction discs concentric with said revoluble discs and fixed to said wheel supporting member, one pair of said resilient discs being placed between each pair of said revoluble discs, and an expansion cell between the members of each pair of said stationary discs adapted when inflated to deform the resilient discs into frictional engagement with the companion pair of revoluble discs.

7. In a structure as defined in claim 5, the composite brake structure and support therefor being provided with passages through which air is permitted to circulate outwardly through and around the surfaces of said structure to cool the same.

JAMES T. DICKSON.